United States Patent [19]

Suzuki

[11] Patent Number: 5,014,838
[45] Date of Patent: May 14, 1991

[54] DIAPHRAGM SPRING ARRANGEMENT FOR A CLUTCH

[75] Inventor: Hiroshi Suzuki, Aichi, Japan

[73] Assignee: Aisin Seiki Kabushiki Kaisha, Kariya, Japan

[21] Appl. No.: 496,635

[22] Filed: Mar. 21, 1990

[30] Foreign Application Priority Data

Mar. 31, 1989 [JP] Japan .................................. 1-036422

[51] Int. Cl.$^5$ .............................................. F16D 13/44
[52] U.S. Cl. .................................. 192/89 B; 192/70.27
[58] Field of Search ............................ 192/89 B, 70.27

[56] References Cited

U.S. PATENT DOCUMENTS

| 3,939,951 | 2/1976 | Sink et al. | 192/89 B |
| 4,660,695 | 4/1987 | Fukatani | 192/89 B |

FOREIGN PATENT DOCUMENTS

| 58-17227 | 2/1983 | Japan | 192/89 B |
| 146721 | 9/1983 | Japan | 192/70.27 |
| 270924 | 11/1988 | Japan | 192/89 B |

*Primary Examiner*—Allan D. Herrmann
*Assistant Examiner*—Andrea Pitts
*Attorney, Agent, or Firm*—Burns, Doane, Swecker & Mathis

[57] ABSTRACT

A clutch includes plural tabs formed on an internal circumference of a clutch cover and bent toward a pressure plate through an opening provided on one end of a slit of a diaphragm spring. The diaphragm spring has plural pivot rings arranged on either side of the diaphragm spring and supported by the tab. The tabs are divided into at least two types. A long wide tab and a short wide tab, shorter than the long wide tab, permit the connecting force and the bending load of the plural pivot rings and the diaphragm spring to be reduced.

10 Claims, 4 Drawing Sheets

DIAPHRAGM SPRING ARRANGEMENT FOR A CLUTCH

BACKGROUND OF THE INVENTION

1. Field of the Invention

This invention relates to a clutch apparatus provided with a diaphragm spring for use in an automotive vehicle.

2. Description of the Related Art

A prior clutch apparatus is known from Japanese Laid-Open Publication No. 58-17227. As shown in FIG. 9, a plurality of equally pitched tabs 2 are provided on an internal circumference 1a of a clutch cover 1. A plurality of pivot rings 4, each of which acts as a fulcrum point for a diaphragm spring 3 are supported on the clutch cover 1 by bending a top end portion 2a of each tab 2 toward a pressure plate 5 which is arranged in the clutch cover 1. Each tab 2 is, as shown in FIG. 10, snugly fitted in an opening portion 3b formed at an outer end of a slit 3a of the diaphragm spring 3. As shown in FIG. 11, each tab 2 has a width which is only slightly shorter than the width of the opening portion 3b so as to provide the snug fit and prevent the clutch cover 1 and the diaphragm spring 3 from rattling therebetween.

However, the foregoing clutch apparatus, is not easy to assemble due to a requirement for a strong plural pivot rings 4 and the diaphragm spring 3 into the plural tabs 2, and there is a fear that the diaphragm spring 3 will not work smoothly because of the need for the strong connection force between the tabs, rings and spring.

In light of the above-mentioned drawbacks, recently, a clutch apparatus has been proposed which is equipped with a tab 2', 2" as shown in FIG. 12 or FIG. 13. The tab 2' (shown in FIG. 12) is provided with a central slit 6 at a top end portion 2a' thereof as well as the tab 2" (shown in FIG. 13) is provided with cutout portions 7 at both sides of a top end portion 2a" thereof.

However, the clutch apparatus provided with either of the tabs 2', 2" has the same problem as the clutch apparatus of FIGS. 9–12.

SUMMARY OF THE PRESENT INVENTION

It is an object of the present invention to provide a clutch apparatus with a tab which reduces the connecting force and the heavy bending load in plural pivot ring clutches.

It is still another object of the present invention to provide for easy assembly of a clutch apparatus.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein.

EMBODIMENTS OF THE INVENTION

Figure 1:
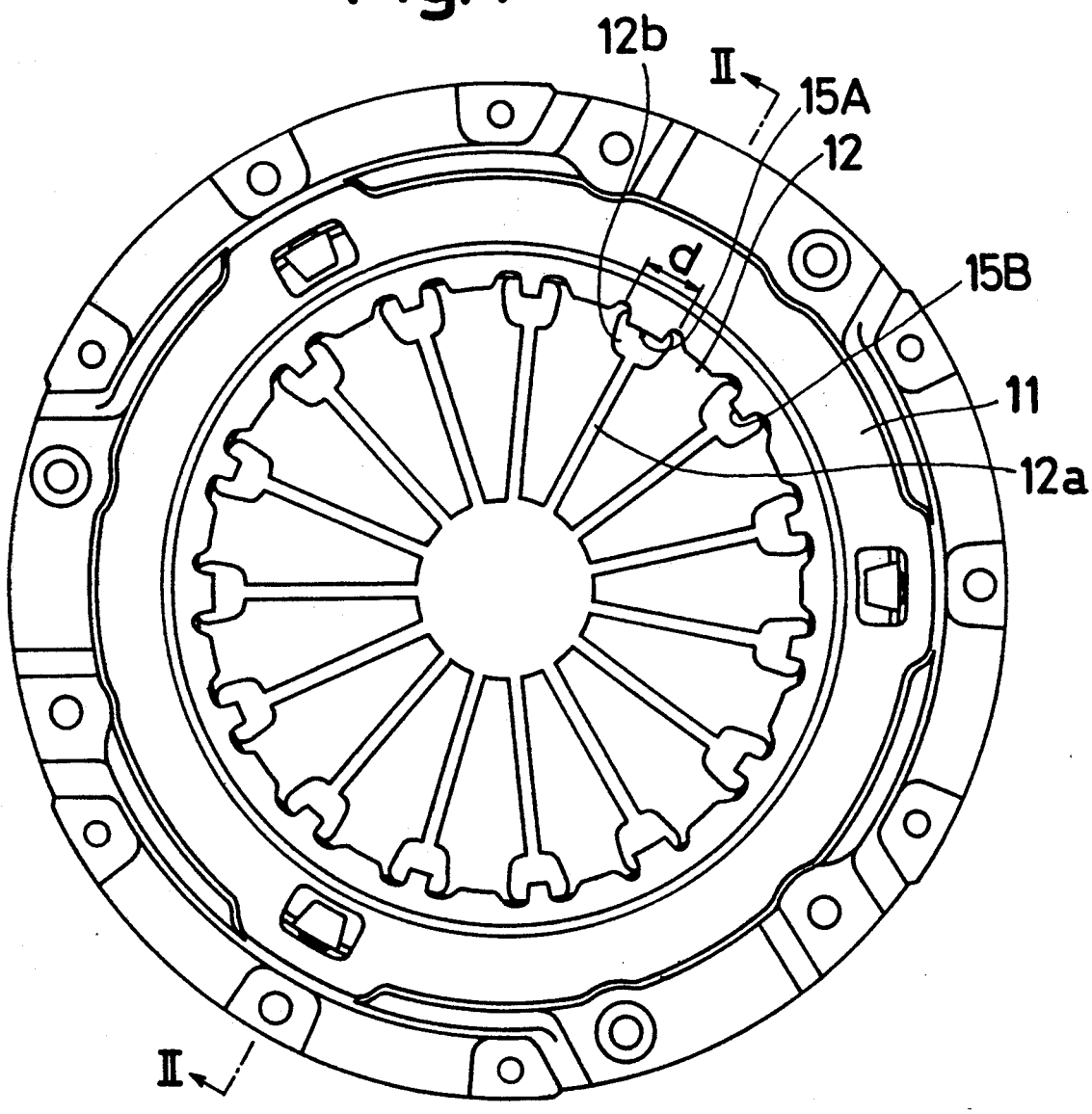
FIG. 1 is a front view of a clutch apparatus illustrating a first embodiment of the present invention; 1
Figure 2:
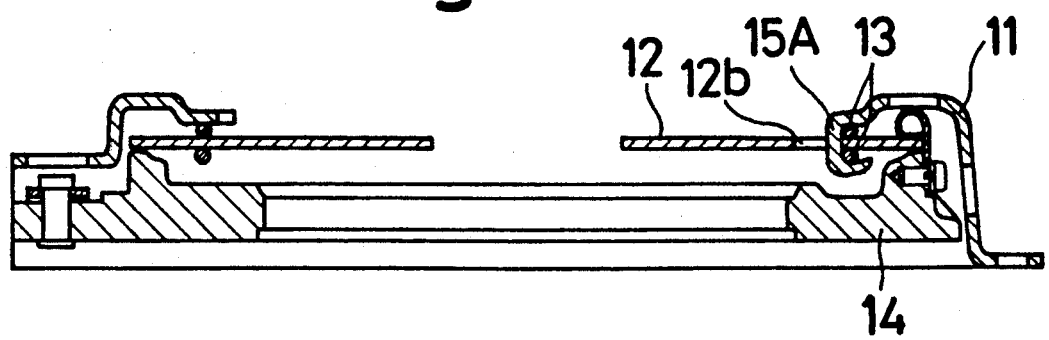
FIG. 2 is a sectional view of a clutch apparatus illustrated in the first embodiment of the present invention taken along the line II—II in FIG. 1.
Figure 11:
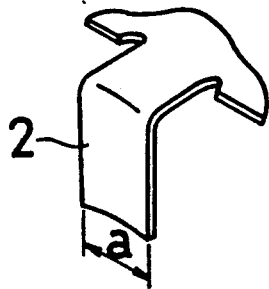
FIG. 11 through FIG. 13 illustrate tabs of the conventional clutch apparatus.
Figure 12:
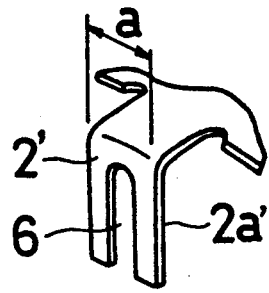
Figure 13:
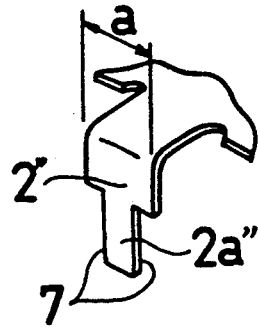

In a first embodiment, as shown in FIG. 1 and FIG. 2, 11 is a clutch cover, 12 is a diaphragm spring, 13 is a pivot ring, and 14 is a pressure plate. The diaphragm spring 12 is fixed to the clutch cover 11 at its external circumference through two pivot rings 13 by plural tabs 15. Arrangement of these members is the same as in the conventional clutch apparatus.

Figure 3:
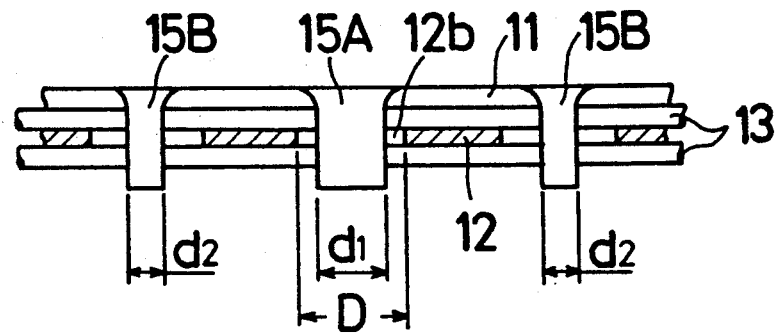
FIG. 3 is a partially enlarged view of a tab of a clutch apparatus illustrated in the first embodiment of the present invention.

The equally pitched plural tabs 15, supported to the respective plural pivot rings 13, are integrally formed with an internal circumference of the clutch cover 11, as shown in FIG. 3. The tabs 15 are divided into two types: a long wide tab 15A having a width d1 and a short wide tab 15B having a width d2 shorter than that of the tab 15A. The width d1 of the tab 15A is formed to be slightly less than the width D of an opening portion 12b which is formed at outer end of a slit 12a of the diaphragm spring 12. With respect to d1, d2 and D the widths of the tabs are related to each other by the formula $D > d1 > d2$, and the width d2 of the short tab 15B is provided to be of enough length to support the diaphragm spring 12 and the plural pivot rings 13. The long tab 15A is arranged at least at three positions on the internal circumference of the clutch cover 11 by equal pitch, i.e., equally spaced positions. On the other hand, the short tab 15B is continuously arranged, for example, four in a series as shown in FIG. 1 in between each of the tabs 15A by equal pitch, i.e., equally spaced positions, whereby each pivot ring 4 is supported so as to act as a fulcrum point for a diaphragm spring 12.

The width d1 of the tab 15A is formed to be slightly less than a width D of an open portion 12b of the diaphragm spring 12. On the other hand, the width d2 of the short tab 15B is wide enough to support the diaphragm spring 12 and the plural pivot rings 13, and is also of shorter width in comparison to the tab of the conventional clutch apparatus. Accordingly, a reduction in the bending load of a plural pivot rings 13 and the diaphragm spring 12 is obtained. Consequently, it is easy to assemble the plural pivot rings 13 and the diaphragm spring 12 into the plural tabs 15, and the diaphragm spring 12 can be smoothly actuated.

Figure 4:
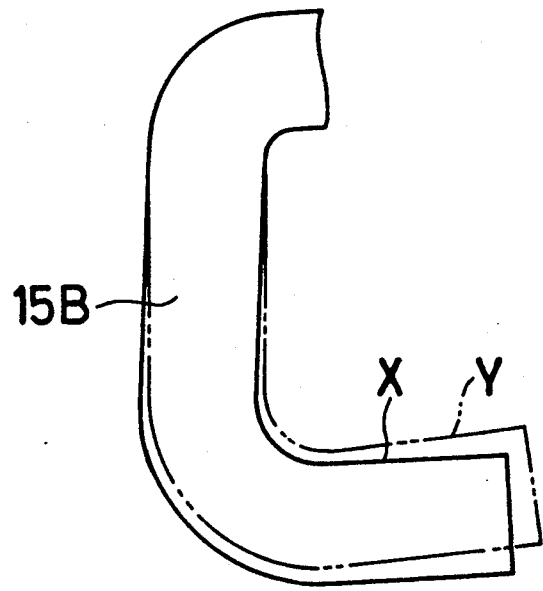
FIG. 4 is a view shown of the bent tab of a clutch apparatus of the present invention.

In FIG. 4, X indicates the state of the tab 15B when the clutch (not shown) is disengaged, an Y indicates the state of the tab 15B when the clutch disk (not shown) is engaged. When the short wide tab 15B changes shape due to the bending load of the diaphragm spring 12 at the time the clutch disk (not shown) is disengaged, the tab 15B is able to bend toward the pressure plate 14.

Figure 5:
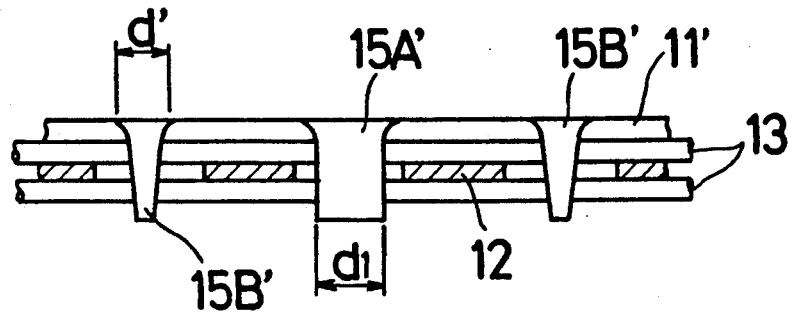
FIG. 5 is a front view of a partially enlarged view of a tab for the clutch apparatus in a second embodiment of the present invention.

In a second embodiment, as shown in FIG. 5, a long wide tab 15A' is the same shape to the tab 15a of FIG. 3. A short wide tab 15B' is formed so as to gradually narrow or decrease in width in the direction from a top end to the bottom or base. A width d' of the short wide tab 15B' is less than a width d1 of the long wide tab 15A'. Accordingly, rigidity of the top end of the tab 15B' can be decreased without reducing the rigidity of the base of the tab as compared to the first embodiment. As a result, it is easier to assemble the plural pivot rings 13 and the diaphragm spring 12.

Figure 6:
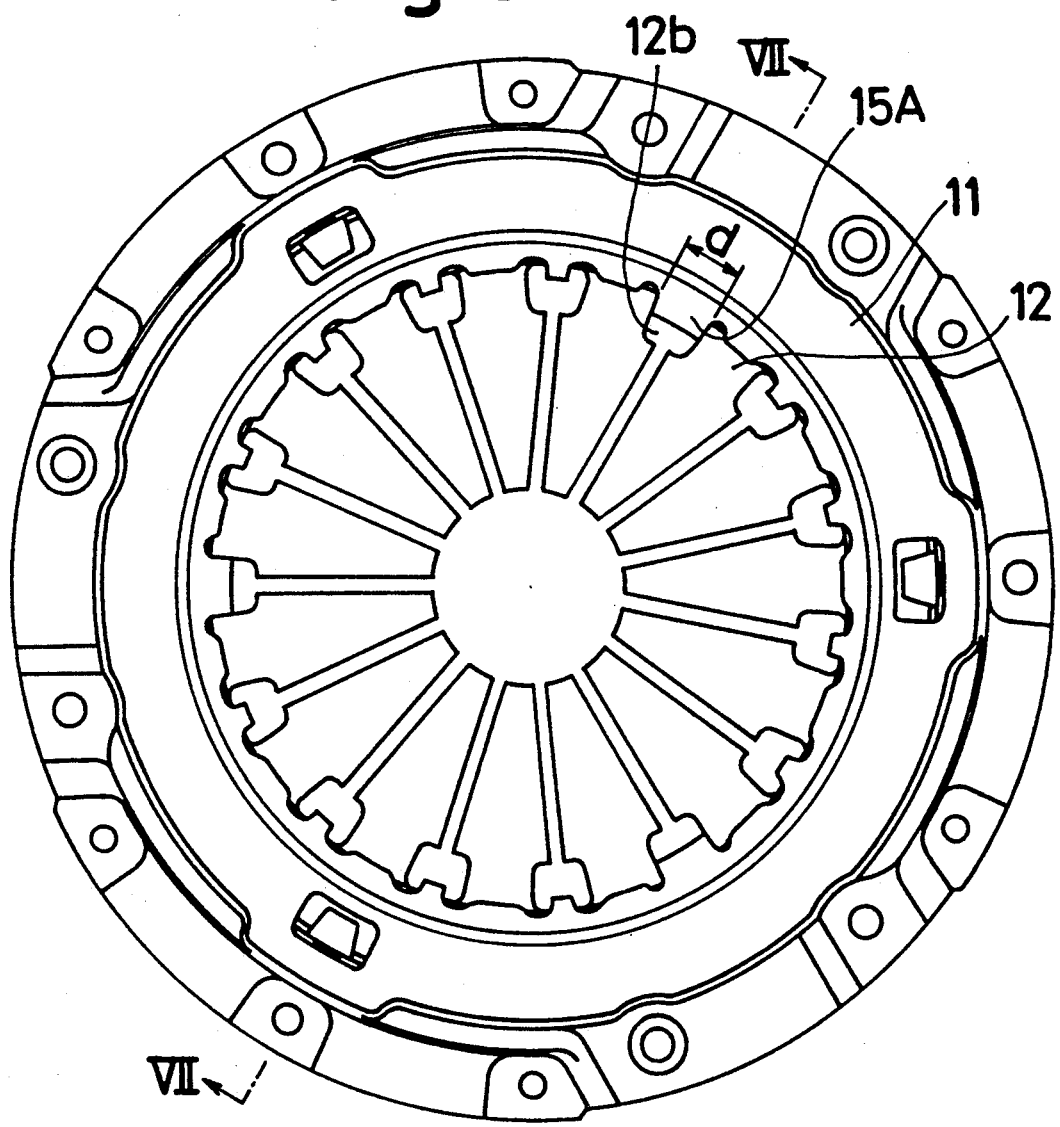
FIG. 6 is a front view of a clutch apparatus showing a third embodiment of the present invention.
Figure 7:
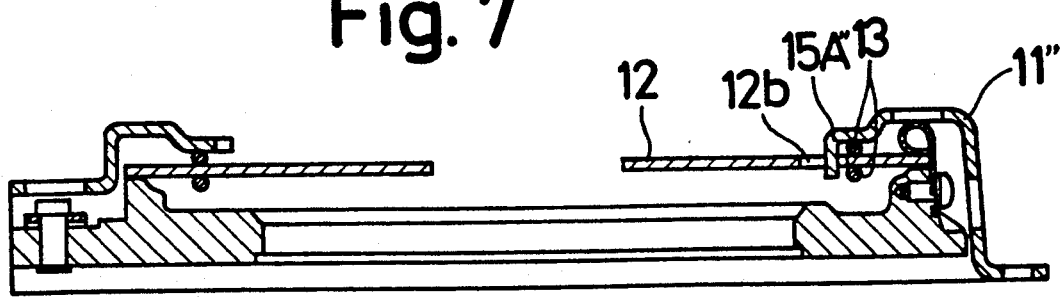
FIG. 7 is a sectional view of a clutch apparatus of a third embodiment of the present invention taken along the line VII—VII in FIG. 6.
Figure 8:
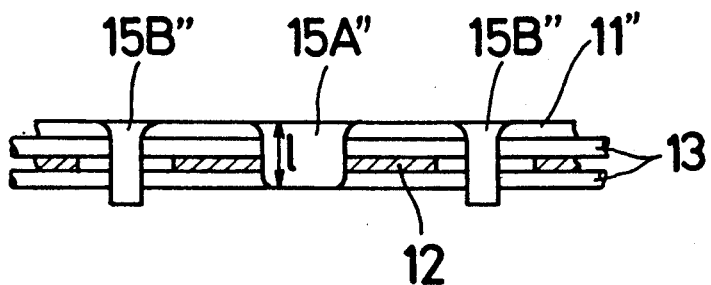
FIG. 8 is a partially enlarged view of a tab of the clutch apparatus of a third embodiment of the present invention.
Figure 9:
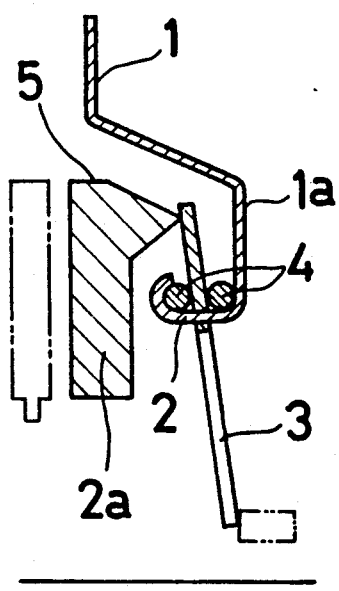
FIG. 9 is a partially enlarged sectional view of the conventional clutch apparatus.
Figure 10:
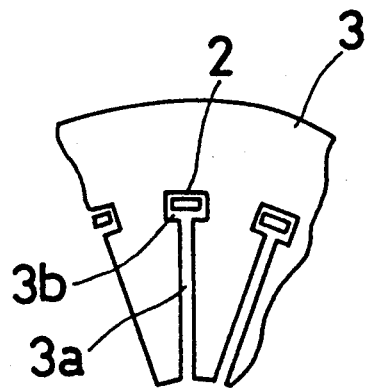
FIG. 10 is a partially enlarged view of the conventional clutch apparatus.

In a third embodiment, as shown in FIG. 6 through FIG. 8, a short wide tab 15B'' is the same shape as the one in the first embodiment. On the other hand, a long wide tab 15A'' is nearly equal to the circumferential width of the opening portion 12b and has a length 1 that is only slightly projecting from the diaphragm spring 12 and is assembled without bending of the tab 15A''. Therefor, the connecting force of the plural pivot rings 13 can be reduced since there is no such force associated with the tab 15A''. The short wide tab could be provided in different widths.

The principles, preferred embodiments and modes of operation of the present invention have been described in the foregoing application. The invention which is intended to be protected herein should not, however, be s these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A clutch apparatus comprising:
a clutch fixed to a flywheel and connected to a pressure plate;
a diaphragm spring disposed between said clutch cover and said pressure plate and provided with a slit;
plural tabs integrally formed on an internal circumference of said clutch cover and bent toward said pressure plate, so as to extend through an opening portion provided at one end of said slit;
said plural tabs including long wide tabs and short wide tabs shorter than said long wide tabs, the short wide tabs arranged between said long wide tabs and being of constant width from top end to base.

2. A clutch apparatus according to claim 1, wherein at least three of the long wide tabs are arranged about an integral circumference of said clutch cover by a width substantially equal to a circumferential width of said opening portion.

3. A clutch apparatus according to claim 2, wherein the long wide tabs are provided with a width slightly less than the circumferential width of said opening portion.

4. A clutch apparatus according to claim 1, wherein at least three of the long wide tabs are provided to slightly project from said diaphragm spring along an internal circumference of said clutch cover.

5. A clutch apparatus according to claim 4, wherein the long wide tab has a width slightly less than the circumferential width of said opening portion.

6. A clutch apparatus comprising:
a clutch cover fixed to a flywheel and connected to a pressure plate;
a diaphragm spring disposed between said clutch cover and said pressure plate and provided with a slit;
plural tabs integrally formed on an internal circumference of said clutch cover and bent toward said pressure plate, so as to extend through an opening portion provided at one end of said slit;
said plural tabs including at least long wide tabs and short wide tabs shorter than said long wide tabs, the short wide tabs arranged between each of said long wide tabs, wherein the short wide tab decreases in width from a top end to base end.

7. A clutch apparatus according to claim 6, wherein at least three of the long wide tabs are arranged about an internal circumference of said clutch cover by a width substantially equal to a circumferential width of said opening portion.

8. A clutch apparatus according to claim 6, wherein the long wide tabs are provided with a width slightly less than the circumferential width of said opening portion.

9. A clutch apparatus according to claim 6, wherein at least three of the long wide tabs are provided to slightly project from said diaphragm spring along an internal circumference of said clutch cover.

10. A clutch apparatus according to claim 9, wherein the long wide tab has a width slightly less than the circumferential width of said opening portion.

* * * * *